United States Patent [19]

Fogel et al.

[11] Patent Number: 5,496,529
[45] Date of Patent: Mar. 5, 1996

[54] ALUMINUM PHOSPHATES AND BINDER COMPOSITIONS/CERAMIC MATERIALS COMPRISED THEREOF

[75] Inventors: William Fogel, Ales; Laurent Frouin, L'Hay Les Roses, both of France

[73] Assignee: Rhone-Poulenc Chimie, Courbevoie, France

[21] Appl. No.: 214,172

[22] Filed: Mar. 17, 1994

[30] Foreign Application Priority Data

Mar. 17, 1993 [FR] France .................... 93 03063

[51] Int. Cl.$^6$ .................... C01B 15/16; C01B 25/26; C04B 35/10
[52] U.S. Cl. .................... 423/305; 423/309; 423/311; 501/1; 501/127; 501/153
[58] Field of Search .................... 501/127, 153; 423/305, 309, 311; 106/690, 629, 691

[56] References Cited

U.S. PATENT DOCUMENTS

| | | | |
|---|---|---|---|
| 3,813,253 | 5/1974 | Neises | 106/629 |
| 3,899,342 | 8/1975 | Birchall et al. | 501/127 |
| 3,900,331 | 8/1975 | Cassidy | 501/127 |
| 3,923,534 | 12/1975 | Cassidy | 106/691 |
| 3,943,231 | 3/1976 | Wasel-Nielen et al. | 106/629 |
| 3,945,839 | 3/1976 | Manigault | 501/127 |
| 4,394,174 | 7/1983 | Tomic | 106/691 |
| 4,833,576 | 5/1989 | Mers et al. | 106/691 |

FOREIGN PATENT DOCUMENTS 66314 2/1973 Luxembourg.

Primary Examiner—Mark L. Bell
Assistant Examiner—Michael Marcheschi
Attorney, Agent, or Firm—Burns, Doane, Swecker & Mathis

[57] ABSTRACT

Novel aluminum phosphates, in particular amorphous aluminum phosphate powders having a BET specific surface no greater than 25 m$^2$/g, well suited as binders/hardeners or for the production of ceramic shaped articles, are prepared by reacting at least one aluminum compound, e.g., an aluminum oxide, hydroxide or oxyhydroxide, with phosphoric acid or an aluminum phosphate, e.g., an acid aluminum orthophosphate, in a liquid reaction medium devoid of inorganic acid anions other than of phosphoric acid, and then spray- or freeze-drying the suspension thus obtained.

8 Claims, No Drawings

ALUMINUM PHOSPHATES AND BINDER COMPOSITIONS/CERAMIC MATERIALS COMPRISED THEREOF

BACKGROUND OF THE INVENTION

1. Field of the Invention:

The present invention relates to novel aluminum phosphates, to a process for the preparation thereof, and to binder/hardener compositions and ceramic materials comprising same.

2. Description of the Prior Art

Inorganic binders based on aluminum phosphates have long been known to this art. Typically, a refractory compound such as $Al_2O_3$ or $SiO_2$ is formulated with a binder which essentially consists of an aluminum or chromium hydrogenphosphate or phosphoric acid.

Another type of binder is prepared by admixing aluminum and phosphoric acid in an Al/P molar ratio of approximately 1, at about 100° C. A very viscous suspension is thus obtained which is difficult to dry and, for this reason, is difficult to use.

Moreover, "chemically bonded" ceramic components are desiderata in this art, namely, those produced at moderate temperatures, for example, below 400° C., from a mixture of aluminum and phosphoric acid. These mixtures are formulated in the form of a paste, the use of which, especially at the compacting step, is awkward.

Therefore, need continues to exist for starting materials which are easier to use for the preparation of binders or of ceramic components based thereon, such components, of course, necessarily having to display sufficient mechanical properties.

SUMMARY OF THE INVENTION

Accordingly, a major object of the present invention is the provision of novel aluminum phosphates that are especially useful for the production of ceramic shaped articles having good mechanical strength, the preparation of which is both facile and rapid.

The present invention also features a process for the preparation of such novel aluminum phosphates, comprising reacting at least one aluminum compound with phosphoric acid or an aluminum phosphate, the reaction medium containing no inorganic acid anions other than of phosphoric acid, and then drying the suspension thus obtained by spraying or freeze-drying.

This invention also features novel aluminum phosphates that are amorphous and exist in the dry form or state.

The invention also features novel aluminum phosphates that are amorphous and have a BET specific surface area of no greater than 25 m$^2$/g.

The present invention also features unique compositions of matter comprising the aforesaid novel aluminum phosphates.

The invention also features a binder material comprising the subject novel aluminum phosphates.

Too, the present invention features the production of ceramic components and shaped articles via the compaction of the subject novel aluminum phosphates or compositions comprised thereof.

DETAILED DESCRIPTION OF BEST MODE AND PREFERRED EMBODIMENTS OF THE INVENTION

More particularly according to the present invention, the process for the preparation of the subject novel aluminum phosphates will now be more fully described.

This process comprises, in a first step, reacting at least one aluminum compound with phosphoric acid or an aluminum phosphate.

Any type of phosphoric acid may be used; an aqueous solution, the acid concentration of which ranges from 85% to 75%, is typically employed. A more dilute acid may be used.

An aluminum phosphate may also be used as a starting material reactant. This phosphate will have an Al/P ratio less than that of the phosphate sought to be prepared. In addition, it is an orthophosphate. An acid orthophosphate such as, for example, monoaluminum orthophosphate $Al(H_2PO_4)_3$ is more particularly preferred. The aluminum phosphate reactant will generally be employed in the form of a solution, for example, at a concentration of 50% in the case of monoaluminum orthophosphate.

The aluminum compound is selected from among the aluminum oxides, hydroxides and oxyhydroxides, or mixtures thereof.

It will be appreciated that, in accordance with the present invention, the reaction medium comprises no inorganic acid anions other than of phosphoric acid. Thus, no aluminum salts are used or, stated differently, the reaction is carried out in a medium in which there is neither supply nor presence of salts, with the exception of the aluminum phosphates.

In one preferred embodiment of the invention, an alumina obtained by rapid dehydration of aluminum hydroxides or oxyhydroxides is used as the aluminum compound.

These aluminum hydroxides may be bayerite, hydrargillite or gibbsite and nordstrandite. The oxyhydroxides may be boehmite or diaspore. The dehydration may be carried out in any suitable type of apparatus by means of a stream of hot gases. The inlet temperature of the gases into the apparatus generally ranges from approximately 400° to 1,200° C. and the contact time of the hydroxide or the oxyhydroxide with the hot gases generally ranges from a fraction of a second to 4 or 5 seconds.

An active alumina is thus obtained having a specific surface, measured by the BET method, ranging from 200 to 400 m$^2$/g. Its weight loss on ignition measured by calcination at 1,000° C. generally ranges from 3% to 15%, which corresponds to an $H_2O/Al_2O_3$ molar ratio ranging from 0.17 to 0.85.

This alumina is also of amorphous structure and/or poorly crystallized. By "amorphous" is intended a product, the X-ray diffraction pattern of which does not display any characteristic line for any crystalline phase whatever. By "poorly crystallized" is intended a product, the X-ray diffraction pattern of which displays only one or a few diffuse lines corresponding to the crystalline phase of low temperature transition aluminas, i.e., corresponding essentially to the chi, rho, eta and gamma phases.

Too, such alumina generally is in the form of a particulate product, the particle diameter of which ranging from 0.1 to 300 μm.

Lastly, the readily commercially available aluminum hydroxide, an alumina derived via rapid dehydration of hydrargillite, is more particularly thus used.

The invention is especially applicable to the preparation of phosphates for which the Al/P molar ratio is in the region of or equal to 1. It is also applicable to those with a ratio at least equal to 1, and more particularly with a ratio of from 1 to 4.

To attain these values, the reaction between the aluminum compound and phosphoric acid or the aluminum phosphate is carried out under conditions such that the object ratio is obtained, namely, by using the necessary quantities of reactants.

Once the reactants have been intimately admixed, a suspension is obtained.

It is also possible, in another specific embodiment of the invention, to incorporate a filler into this suspension.

This filler is typically a refractory material or a mixture of such materials. Alumina is a suitable refractory material. Such alumina will preferably be an alumina of low reactivity of the alpha-alumina type. It may also be a clay such as kaolin or, alternatively, quartz, micronized sand or nonreactive silica. Magnesia, dolomite, magnesia-dolomite, magnesia-spinel, forsterite, chromite, lime, magnesia-carbon, dolomite-carbon, magnesia-dolomite-carbon and carbides such as silicon or tungsten carbide, nitrides such as silicon or boron nitride, borides, zirconia, zircon, aluminum or zirconium silicates, oxides of zinc, calcium, magnesium, titanium, tin, iron or chromium asbestos, mica and aluminum phosphates are also exemplary refractory materials. The incorporation of a filler material makes it possible to improve the mechanical properties of the ceramic components/shaped articles produced from the aluminum phosphates of the invention.

It will here be appreciated that the aforementioned calculation of the Al/P ratio does not take account of the amount of aluminum which may be introduced via the optional filler.

It too will be appreciated that the order of introduction of the reactants and of the filler is unimportant. It is possible, in particular, to introduce at least a portion of the aluminum compound with the filler or after the latter. The filler must have a suitable particle size to enable it to be incorporated into the suspension.

In a second step of the process of the invention, the suspension thus obtained is dried by spraying.

Any suitable apparatus may be used for this spraying, such as an atomizer fitted with a turbine or with a nozzle, depending, especially, on the particle size which it is desired to obtain for the dry product.

The gas temperatures for the drying may vary over a wide range. However, the outlet temperature must be fixed such as to preserve the amorphous character or nature of the aluminum phosphate of the invention. This temperature will generally range from 60° to 130° C. The inlet temperature advantageously ranges from 100° to 300° C.

Upon completion of the spray-drying, a powder is thus obtained in which the particle size may range, for example, from 10 to 300 µm.

It is also possible, in another preferred embodiment of the invention, to carry out the drying by freeze-drying. The conditions of freeze-drying are well known to this art.

It will also be appreciated that it is possible, where appropriate, to add the filler, after the drying step, to the dry product thus obtained.

The product obtained will now be more fully described. By "product obtained" is intended an aluminum phosphate which results from the reaction between the aluminum compound and phosphoric acid or the aluminum phosphate. In certain instances, the process described above may provide a mixture comprising the phosphate according to the invention and other residual compounds, which may be crystallized or otherwise, such as aluminum compounds which have not reacted with the phosphoric acid or the aluminum phosphate, in particular when the Al/P ratio is greater than 1.

This product is an amorphous aluminum phosphate. By "amorphous" is intended a product, the X-ray diffraction pattern of which does not display any characteristic line of any crystalline phase whatsoever. The product of the invention has not crystallized, in particular, in the form $AlPO_4$. The amorphous character may also be demonstrated by NMR analysis.

As indicated above, the aluminum phosphate according to the present invention is provided in the dry form or state. By "dry form" or "dry state" is intended that the aluminum phosphate of the invention only contains, as any water content thereof, water of hydration.

In another embodiment of the invention, the subject phosphate is amorphous and its BET specific surface is not greater than 25 $m^2/g$. Preferably, this specific surface is not greater than 15 $m^2/g$ and even more preferably is not greater than 10 $m^2/g$. In certain instances, this surface is not greater than 5 $m^2/g$. In an advantageous variant of this embodiment, the phosphate is also present in dry form.

Another characteristic of the phosphate of the invention is its pH. This is less than 5 and preferably not greater than 4. These pH values are determined by measurement in suspensions of the product at a concentration of 1% in water.

The aluminum phosphate of the invention, when it is heated and begins to lose its water of hydration, crystallizes in the form $ALPO_4$, which effects the setting of the material into a solid.

Such aluminum phosphate may be incorporated into any suitable composition; thus, the invention also features compositions comprising the subject aluminum phosphate.

In the particular case where a filler has been used in the preparative process described above, this filler is present in the dry product such that a composition is obtained in the form of a powder comprising a filler and an aluminum phosphate according to the invention.

The aluminum phosphates or the compositions of the invention may be used in the preparation of materials comprising a binder. In this instance, a phosphate of the invention is used as a binder, optionally with a filler, in a refractory material which may be of the same type as that described above. Various processes which are well known to this art may be used, in which, generally, the phosphate, the refractory material and water are intimately admixed and shaped. A mortar based on the refractory material, binder and water may thus be formulated, and then poured into a mold and heated. It is also possible to form a slip which is compressed under cold conditions and the pressed article is subsequently subjected to heating.

The aluminum phosphates or the compositions of the invention may also be used, as such, for the production of refractory materials, especially by admixing same with water and then compressing the mixture under cold conditions.

The aluminum phosphates or the compositions of the invention may also be used for the preparation of ceramic components, especially of the chemically bonded type, having a good mechanical strength.

In this case, cold pressing of a phosphate of the invention is generally carried out, optionally with a filler or, more generally, of a composition comprising such a phosphate. The temperature of compression, or compaction, usually ranges from 80° to 400° C.

The aluminum phosphates or the compositions of the invention may also be used as hardeners for, in particular, alkali metal silicates, with a view to applications such as the reinforcement or consolidation of ground formations or cement. They may also be employed as metal-coating agents in order to afford metals protection against corrosion, or for electrical insulation.

In order to further illustrate the present invention and the advantages thereof, the following specific examples are given, it being understood that same are intended only as illustrative and in nowise limitative.

In said examples to follow, the pH value which is reported was measured in suspensions at a concentration of 1% in water.

EXAMPLE 1

As the aluminum compound, an alumina produced by rapid dehydration of an aluminum hydroxide and marketed by Procatalyse under the trademark Spheralite 509A was used in this example.

This alumina had the following characteristics:

(a) Loss on ignition at 1000° C.: 10%, (b) X-ray diffraction: essentially amorphous, (c) Mean diameter (measured with a CILAS 850 granulometer): 8 μm, (d) BET surface: 325 m$^2$/g.

Into a reactor fitted with a RAYNERI stirrer were gradually added 49.1 g of 509A alumina in 100 g of 85% phosphoric acid $H_3PO_4$. A suspension of molar ratio Al/P=1 was thus obtained, into which was then incorporated a mixture of 100 g of α-alumina (mean diameter=5 μm) and 49.1 g of 509A alumina, followed by 225.5 g of water. The final Al/P ratio was 2, without taking account of the α-alumina, considered to be a filler.

The suspension was sprayed by means of a BUCHI "190 mini spray dryer" apparatus under the following operating conditions:

(i) weight of solution atomized: 476.3 g, (ii) air inlet temperature: 200° C., (iii) outlet temperature: 120° C., (iv) flow rate: 23 ml/min, (v) weight of product recovered: 213.3 g.

The powder obtained was of good appearance and did not form lumps. X-ray diffraction analysis revealed the starting α-alumina (filler) as the only crystallized phase, without crystallization of $AlPO_4$. The BET surface was 4 m$^2$/g. The pH was 3.0.

The powder was then compressed at 1,800 kg/cm$^2$ and 200° C. for 4 hours in a cylindrical mold in order to form a disc of 7 cm diameter and 0.5 cm thickness. The disc was then cut into small bars of approximate dimensions 5×0.4× 0.5 mm$^3$ which were tested under 3-point flexion (interaxial distance 3 cm).

The flexural strength of the material was 60 MPa, the density was 2.5 g/cm$^3$ and the porosity was 0.03 ml/g (porosity to mercury) which was equivalent to 7.5% by volume.

EXAMPLE 2

196.7 g of 509A alumina were gradually added to 200 g of 85% $H_3PO_4$. Dilution was with 471 g of water. The Al/P ratio was equal to 2.

Spraying in a BUCHI apparatus was carried out under the same conditions as in Example 1.

A free-flowing powder was obtained which was amorphous by X-ray analysis. Its BET specific surface was 4.8 m$^2$/g and its pH was 3.0.

Small bars were then formed therefrom as in Example 1.

The following results were obtained:

(a) Density of the material: 2 1 g/cm$^3$, (b) Flexural strength: 43 MPa.

EXAMPLE 3

295 g of 509A alumina were gradually added to 200 g of 85% phosphoric acid. The mixture was diluted with 956.9 g of water. The Al/P ratio was equal to 3.

Spraying was carried out as in Example 1.

A powder was obtained which was amorphous by X-ray analysis. Its BET surface was 2.9 m$^2$/g and the pH was 3.1.

EXAMPLE 4

98.3 g of 509A alumina were added to 200 g of 85% phosphoric acid, followed by 100 g of alpha-alumina of the same type as in Example 1 as filler and 497.9 g of water (a portion of the water was added with the 509A alumina in order to facilitate mixing).

Spraying was carried out as in Example 1.

X-ray diffraction analysis of the powder obtained evidenced the presence of α-$Al_2O_3$ exclusively. The BET specific surface of the powder was 5 m$^2$/g and its pH was 2.6.

EXAMPLE 5

134.1 g of $Al(OH)_3$ were added to 100 g of 85% phosphoric acid. 100 g of α-$Al_2O_3$ and 225 g of water were then added. The characteristics of the aluminum hydroxide used were the following:

(a) PROLABO product ref. 20984298, (b) loss on ignition 1,000° C.: 34%, (c) particle size: 20 μm, (d) BET surface: <0.5 m$^2$/g, (e) X-ray diffraction: crystallized gibbsite.

Spraying was carried out under the same conditions as in Example 1.

Analysis of the powder obtained:

(i) X-ray diffraction: α-$Al_2O_3$ (filler) and unreacted $Al(OH)_3$, (ii) BET surface: 0.3 m$^2$/g, (iii) pH: 2.7.

By thermogravimetric analysis (characteristic loss of weight of $Al(OH)_3$ at about 350° C.), it was possible to calculate that approximately half of the $Al(OH)_3$ had reacted with $H_3PO_4$ to form an amorphous phosphate according to the invention exhibiting an Al/P ratio equal to 1.

EXAMPLE 6

32.4 g of the suspension prepared in Example 1 were freeze-dried using an ALPHA I-5 CHRISS apparatus.

17.8 g of a dry powder were recovered, the characteristics of which were the following:

(i) Specific surface: 0.7 m$^2$/g, (ii) pH: 2.7.

By X-ray diffraction, the alpha-alumina filler was identified as the only crystallized phase.

EXAMPLE 7

This example illustrates the use of the phosphate of the invention as a binder.

The following mixture was prepared:
(a) powder prepared by atomization in Example 4: 5 g,
(b) quartzose sand of mean particle size 0.2 mm: 23.8 g,
(c) water: 4.2 g.

The mixture obtained was compressed at room temperature (20° C.) and at 1,000 kg/cm² in a parallelepipedal mold to form samples of dimensions:

5 cm (length)×0.8 cm (width)×1 cm (height).

The sample was then dried at 50° C. in an oven for 1 hour and was subsequently placed in a kiln at 200° C. for 4 hours.

The crushing strength of the material obtained was 25 MPa.

EXAMPLE 8

This example illustrates the use of a phosphate of the invention in the preparation of a ceramic.

A slip was prepared of water/solid weight ratio=0.4 with a powder prepared as in Example 1, but containing 50% of α-$Al_2O_3$ filler. This slip was deagglomerated by ultrasound for 5 min. It was then poured into a plaster of Paris mold which permitted obtaining small bars of dimensions 5 cm×1 cm×1 cm. These small bars were calcined at 200° C. for 4 hours. Their 3-point flexural strength was 17 MPa on average.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of an aluminum phosphate having an Al/P ratio of at least 1, which comprises reacting at least one aluminum compound, comprising an aluminum oxide, an aluminum hydroxide, or an aluminum oxyhydroxide, with phosphoric acid or an aluminum phosphate, in a liquid reaction medium devoid of inorganic acid anions other than of phosphoric acid, and then spray- or freeze-drying the suspension thus obtained.

2. The process as defined by claim 1, said alumina having a specific surface ranging from 200 to 400 m²/g.

3. The process as defined by claim 1, further comprising adding a filler material into said suspension.

4. The process as defined by claim 1, further comprising admixing a filler material with the dried suspension.

5. The process as defined by claim 1, said Al/P ratio ranging from 1 to 4.

6. The process as defined by claim 1, comprising reacting said at least one aluminum compound with aqueous phosphoric acid.

7. The process as defined by claim 1, comprising reacting said at least one aluminum compound with an acid aluminum orthophosphate.

8. The process as defined by claim 1, said alumina being amorphous, poorly crystalline, or a mixture thereof.

\* \* \* \* \*